US009891405B2

United States Patent
Chuang et al.

(10) Patent No.: US 9,891,405 B2
(45) Date of Patent: Feb. 13, 2018

(54) CAMERA MODULE AND ELECTRONIC DEVICE USING SAME

(71) Applicant: Chiun Mai Communication Systems, Inc., New Taipei (TW)

(72) Inventors: Chung-Yuan Chuang, New Taipei (TW); Chang-Wei Tsao, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 15/212,414

(22) Filed: Jul. 18, 2016

(65) Prior Publication Data

US 2017/0242214 A1 Aug. 24, 2017

(30) Foreign Application Priority Data

Feb. 19, 2016 (CN) .......................... 2016 1 0092759

(51) Int. Cl.
*H04N 5/225* (2006.01)
*G02B 7/09* (2006.01)
*H02K 33/02* (2006.01)

(52) U.S. Cl.
CPC .............. *G02B 7/09* (2013.01); *H02K 33/02* (2013.01); *H04N 5/2252* (2013.01); *H04N 5/2253* (2013.01)

(58) Field of Classification Search
None
See application file for complete search history.

(56) References Cited

U.S. PATENT DOCUMENTS

| | | | | |
|---|---|---|---|---|
| 9,621,017 B2* | 4/2017 | Lee | ................... | H02K 41/0356 |
| 2011/0058267 A1* | 3/2011 | Wang | ...................... | G02B 7/08 |
| | | | | 359/822 |
| 2011/0249352 A1* | 10/2011 | Ku | ........................ | F16F 1/027 |
| | | | | 359/824 |
| 2011/0262121 A1* | 10/2011 | Yanagisawa | ............ | G02B 7/08 |
| | | | | 396/55 |
| 2012/0008220 A1* | 1/2012 | Lee | ......................... | G03B 3/10 |
| | | | | 359/822 |
| 2015/0103195 A1* | 4/2015 | Kwon | .................. | H04N 5/2253 |
| | | | | 348/208.12 |
| 2016/0170170 A1* | 6/2016 | Go | ......................... | G02B 7/09 |
| | | | | 359/557 |
| 2016/0269644 A1* | 9/2016 | Cheong | ............. | H04N 5/23287 |
| 2017/0134629 A1* | 5/2017 | Park | ..................... | H04N 5/2257 |

* cited by examiner

*Primary Examiner* — Shahbaz Nazrul
(74) *Attorney, Agent, or Firm* — ScienBiziP, P.C.

(57) ABSTRACT

A camera module of an electronic device includes a lens unit with a first coil, a vibration unit with a second coil, and a magnetic unit. The vibration unit is positioned outside the lens unit and spaces a first certain distance with the lens unit. The magnetic unit is positioned outside the vibration unit and spaces a second distance with the vibration unit. When the first coil receives electrical signal, the first coil is actuated to move with the lens unit. When the second coil receives electrical signal, the second coil is actuated to move with the vibration unit with the vibration unit. Therefore, the magnetic blocks are cooperated with the lens assembly and the vibration block, to make an automatic focusing function and a vibration function being combined in the camera module.

18 Claims, 4 Drawing Sheets

CAMERA MODULE AND ELECTRONIC DEVICE USING SAME

FIELD

The subject matter herein generally relates to electronic devices, and particularly to camera modules applied on the electronic devices.

BACKGROUND

Electronic devices with cameras to carry out automatic focusing function are popular. However, electronic devices with characteristics of small and light are required mightily.

BRIEF DESCRIPTION OF THE DRAWINGS

Implementations of the present technology will now be described, by way of example only, with reference to the attached figures.

DETAILED DESCRIPTION

Figure 1:
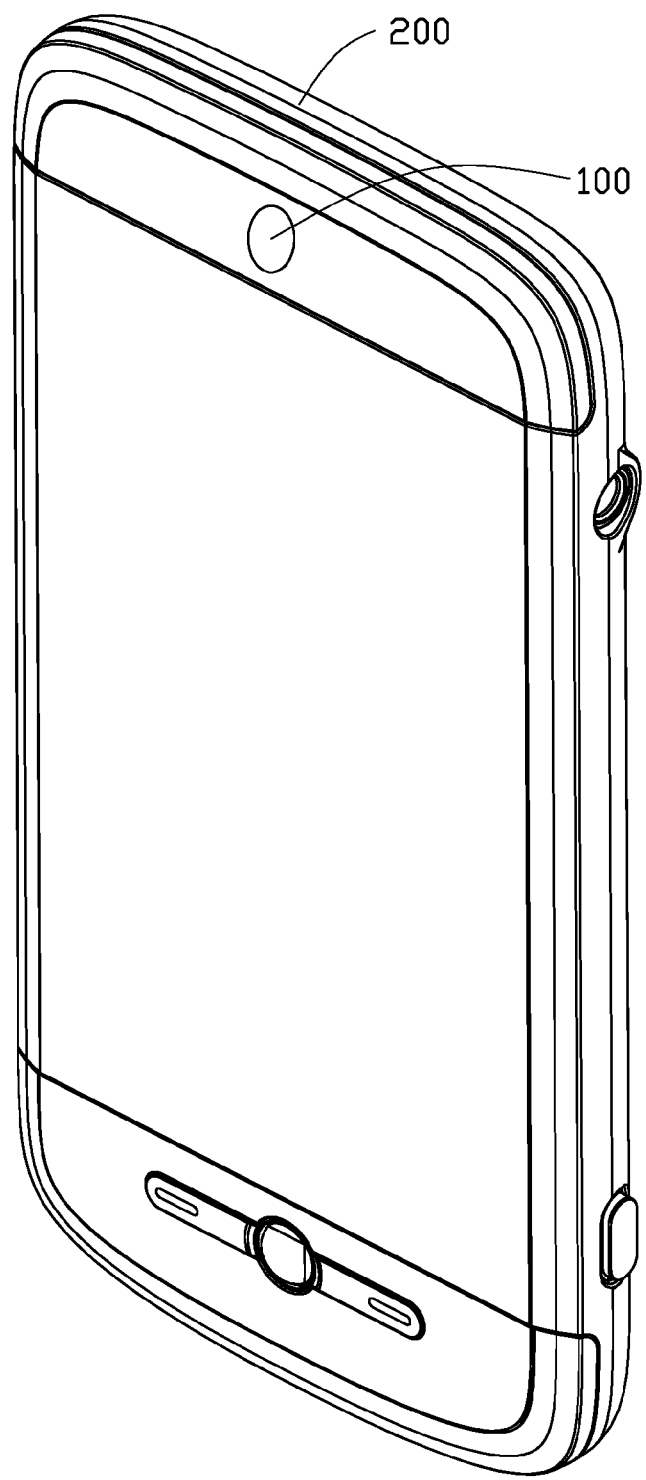
FIG. 1 is a schematic view of an electronic device comprising a camera module.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

The disclosure is described in relation to a camera module and electronic device using same.

FIG. 1 illustrates schematic view of an electronic device 200 comprising a camera module 100. In at least one embodiment, the electronic device 200 can be a mobile phone or a tablet computer.

Figure 2:
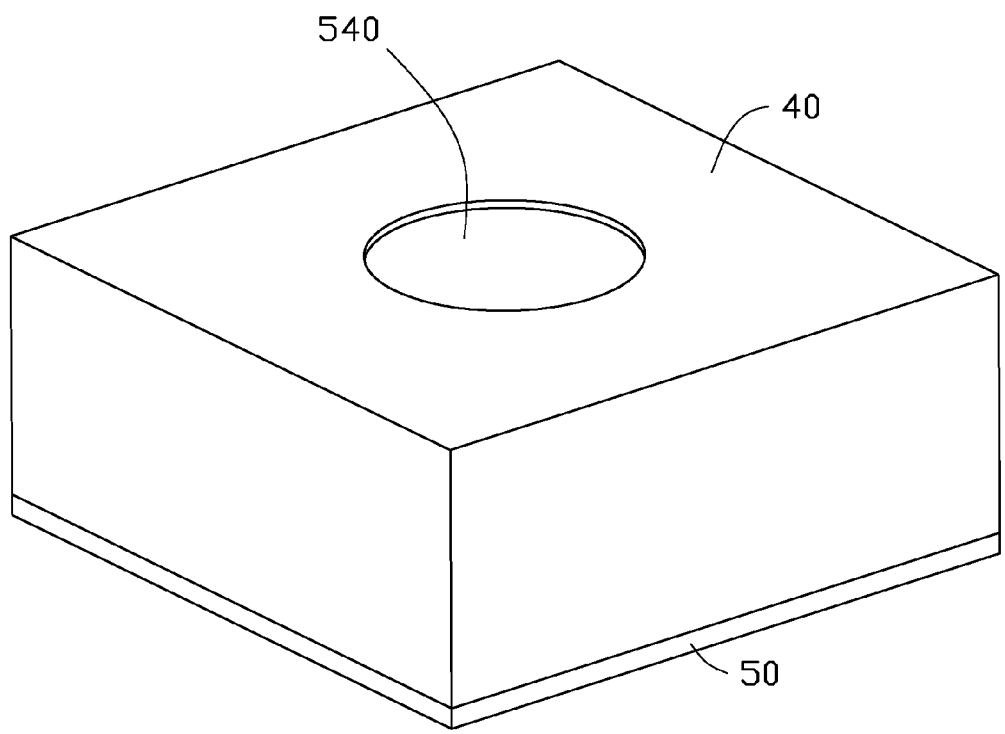
FIG. 2 is a schematic view of the camera module as shown in FIG. 1.
Figure 3:
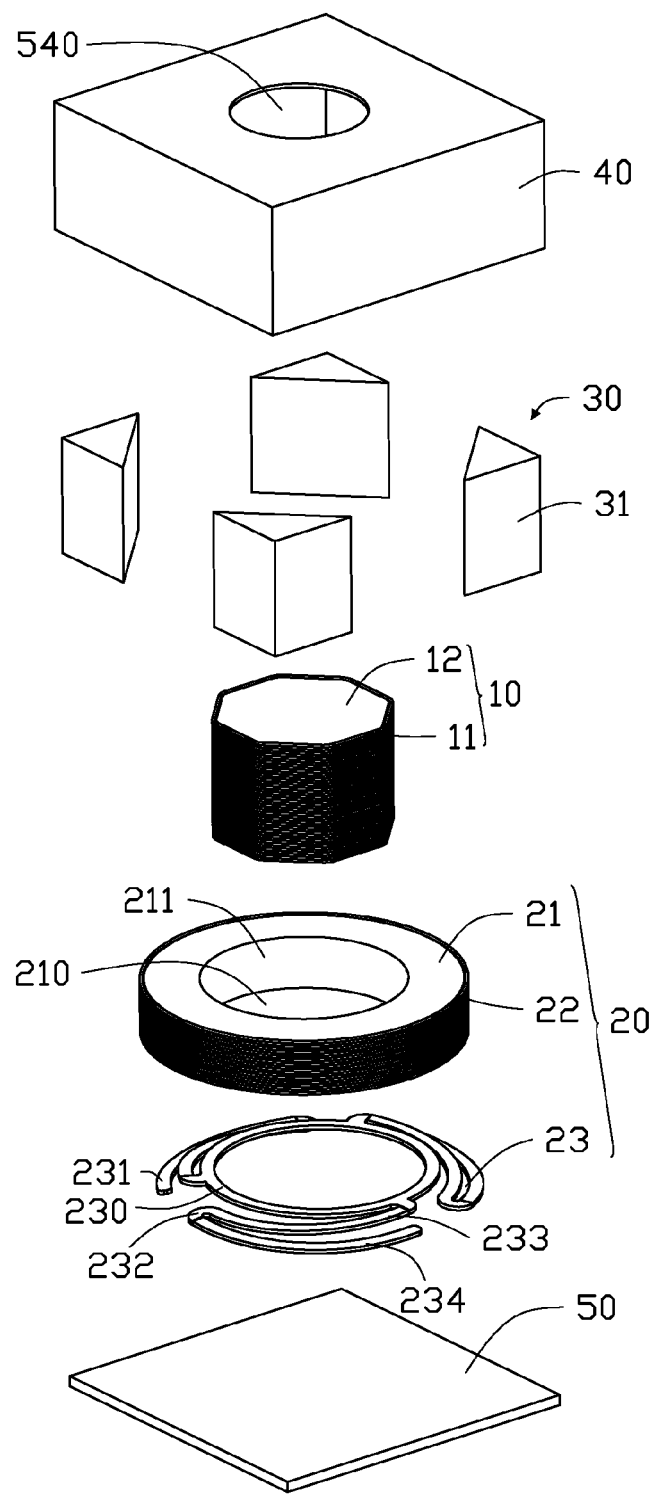
FIG. 3 is an exploded view of the camera module as shown in FIG. 2.

Referring to FIG. 2, the camera module 100 includes a cover 40 and a circuit board 50. Referring to FIG. 3, the camera module 100 also includes a lens unit 10, a vibration unit 20, and a magnetic unit 30. The circuit board 50 is coupled to the cover 40 and forms a receiving space 540. Each of the lens unit 10, the vibration unit 20, and the magnetic unit 30 is positioned on the circuit board 50 and is received in the receiving space 540. In at least one embodiment, the cover 40 is shaped as a cavity structure is made of metallic materials. In at least one embodiment, the cover 40 is a magnet yoke for forming a stronger magnetic field with the magnetic unit 30.

The lens unit 10 includes a first coil 11 and a lens assembly 12. The first coil 11 winds around the outside of the surface of the lens assembly 12. In at least one embodiment, a height of the first coil 11 is the same as that of lens assembly 12. The lens assembly 12 substantially cylindrical and includes a plurality of lens that adjust the object image according to preset focus rate. The plurality of lens are coupled with each other in series along a center axis of the lens assembly 12. The first coil 11 is electrically coupled to the circuit board 50.

The vibration unit 20 includes a vibration block 21, a second coil 22, and an elastic element 23. The vibration block 21 is annular shaped and defines a circular hole 210. A diameter of the circular hole 210 is greater than that of the lens unit 10. The lens unit 10 is positioned in the circular hole 210 of the vibration block 21, and is spaced a first distance with an inner surface 211 of the vibration block 21. The second coil 22 winds around the outside of the surface of the vibration block 21. In at least one embodiment, a height of the second coil 22 is the same as that of vibration block 21. The height of the second coil 22 is less than that of the first coil 11 and the vibration block 21. The second coil 22 is electrically coupled to the circuit board 50.

The elastic element 23 includes a main body 230 and a supporting portion 231. In at least one embodiment, the elastic element 23 is a spring. The number of the supporting portions 231 can be three. Each of the supporting portion 231 is formed a U shape. The supporting portion 231 includes a connecting portion 232, a first spring arm 233, and a second spring arm 234. Both of the first spring arm 233 and the second spring arm 234 extend from two ends of the connecting portion 232, to form the U shape. The first spring arm 233 is coupled to the main body 230. The second spring arm 234 is coupled to the circuit board 50 to receive electrical signal. A diameter of the main body 230 is equal to or less than that of the vibration block 21. The vibration block 21 is supported by the main body 230 and the supporting portion 231, to move perpendicular to the circuit board 50.

Figure 4:
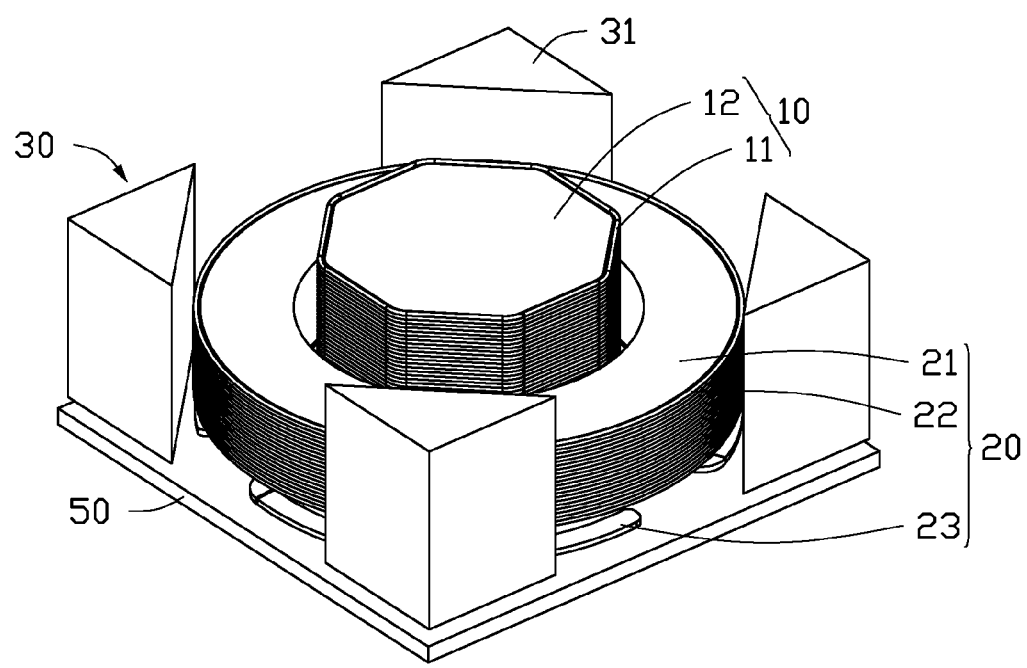
FIG. 4 is a partial assembled view of the camera module as shown in FIG. 2.

Referring to FIG. 4, the magnetic unit 30 includes a plurality of magnetic blocks 31 positioned outside the second coil 22 on the circuit board 50. The plurality of magnetic blocks 31 are spaced a second distance, different from the first distance, with the second coil 22, and are located symmetrically relative to a center axis of the second coil 22. In at least one embodiment, the number of the magnetic blocks 31 is four. The magnetic blocks 31 are positioned adjacent the four corners of the circuit board 50 and the cover 40. A height of magnetic blocks 31 is greater than a height of the vibration unit 20. The height of magnetic blocks 31 is equal to or greater than the height of the lens unit 10.

In use, when the first coil 11 receives electrical signal from the circuit board 50, the first coil 11 is actuated to move by a first electromagnetic force generated from a magnetic field formed by the four magnetic blocks 31. The lens assembly 12 and the first coil 11 are actuated to move perpendicularly towards and away from the circuit board 50. Therefore, an automatic focusing function of the electronic device can be activated.

When the second coil 22 receives electrical signal from the circuit board 50, the second coil 22 is actuated to move by a second electromagnetic force generated from a magnetic field formed by the four magnetic blocks 31. The vibration block 21 and the second coil 22 are actuated to move perpendicularly towards and away from the circuit board 50. Therefore, a vibration function of the electronic device can be activated. Due to the lens unit 10 spaces the first certain distance with the vibration unit 20, the vibration unit 20 cannot impact the lens unit 10.

Thus, the magnetic blocks 31 are cooperated with the lens assembly 12 and the vibration block 21, to make the automatic focusing function and the vibration function being combined in the camera module 100. Therefore, number of the magnetic blocks 31 can be reduced, and space of the electronic device 200 can also be save, which can further reduce a size and a weight of the electronic device 200.

While the disclosure has been described by way of example and in terms of the embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A camera module comprising:
    a lens unit comprising a first coil;
    a vibration unit comprising a second coil, the vibration unit positioned around the lens unit, and located at a first distance from the lens unit; and
    a magnetic unit positioned outside the vibration unit, and located at a second distance from the vibration unit;
    wherein when the first coil receives electrical signal, the first coil is actuated to move with the lens unit by a first electromagnetic force generated from a magnetic field formed by the magnetic unit; when the second coil receives electrical signal, the second coil is actuated to move with the vibration unit by a second electromagnetic force generated from the magnetic field formed by the magnetic unit; and
    wherein the vibration unit further comprises a vibration block and an elastic element supporting the vibration block, the second coil twines around an outer surface of the vibration block; both of the vibration block and the elastic element are positioned outside of the first coil and are located at a third distance from the first coil.

2. The camera module according to claim 1, further comprising a circuit board, wherein the lens unit, the vibration unit, and the magnetic unit are positioned on the circuit board, the first coil and the second coil are electrically coupled to the circuit board; when the first coil receives electrical signal, the first coil and the lens unit are actuated to move along a direction perpendicular to the circuit board; when the second coil receives electrical signal, the vibration unit and the second coil are actuated to move along the direction perpendicular to the circuit board.

3. The camera module according to claim 1, wherein the lens unit further comprises lens assembly, the first coil winds around an outer surface of the lens assembly.

4. The camera module according to claim 1, wherein a height of the vibration unit is less than that of the lens unit.

5. The camera module according to claim 2, wherein the elastic element comprises a main body and a supporting portion, the supporting portion is coupled between the main body and the circuit board.

6. The camera module according to claim 5, wherein the supporting portion comprises a connecting portion, a first spring arm, and a second spring arm; the first spring arm and the second spring arm extend from two terminals of the connecting portion to make the supporting portion to form a U shape.

7. The camera module according to claim 6, wherein the vibration block defines a circular hole, a diameter of the circular hole is greater than that of the lens unit.

8. The camera module according to claim 7, wherein the magnetic unit comprises a plurality of magnetic blocks, the plurality of magnetic blocks are located at a fourth distance from the vibration block and are located symmetrically relative to the vibration block.

9. The camera module according to claim 2, further comprising a cover, wherein the cover is positioned on the circuit board to form a receiving space, each of the lens unit, the vibration unit, and the magnetic unit is positioned on the circuit board and is received in the receiving space.

10. An electronic device comprising a camera module, the camera module comprising:
    a lens unit comprising a first coil;
    a vibration unit comprising a second coil, the vibration unit positioned outside the lens unit, and spacing a first certain distance with the lens unit; and
    a magnetic unit positioned outside the vibration unit, and spacing a second distance with the vibration unit;
    wherein when the first coil receives electrical signal, the first coil is actuated to move with the lens unit by a first electromagnetic force generated from a magnetic field formed by the magnetic unit; when the second coil receives electrical signal, the second coil is actuated to move with the vibration unit by a second electromagnetic force generated from the magnetic field formed by the magnetic unit; and
    wherein the vibration unit also comprises a vibration block and an elastic element supporting the vibration block, the second coil twines around an outer surface of the vibration block; both of the vibration block and the elastic element are positioned outside of the first coil and are located at a third distance from the first coil.

11. The electronic device according to claim 10, wherein the lens unit, the vibration unit, and the magnetic unit are positioned on the circuit board, the first coil and the second coil are electrically coupled to the circuit board; when the first coil receives electrical signal, the first coil and the lens unit move along a direction perpendicular to the circuit board; when the second coil receives electrical signal, the vibration unit and the second coil are actuated to move along the direction perpendicular to the circuit board.

12. The electronic device according to claim 10, wherein the lens unit further comprises lens assembly, the first coil twines an outer surface of the lens assembly.

13. The electronic device according to claim 10, wherein a height of the vibration unit is less than that of the lens unit.

14. The electronic device according to claim 11, wherein the elastic element comprises a main body and a supporting portion, the supporting portion is coupled between the main body and the circuit board.

15. The electronic device according to claim 14, wherein the supporting portion comprises a connecting portion, a first spring arm, and a second spring arm; the first spring arm and the second spring arm extend from two terminals of the connecting portion to make the supporting portion to forming a U shape.

16. The electronic device according to claim 15, wherein the vibration block defines a circular hole, a diameter of the circular hole is greater than that of the lens unit.

17. The electronic device according to claim 16, wherein the magnetic unit comprises a plurality of magnetic blocks, the plurality of magnetic blocks are located at a fourth distance from the vibration block and are located symmetrically relative to the vibration block.

18. The electronic device according to claim 11, wherein the camera module further comprises a cover, the cover is positioned on the circuit board to form a receiving space, each of the lens unit, the vibration unit, and the magnetic unit is positioned on the circuit board and is received in the receiving space.

* * * * *